June 10, 1924.

C. E. COCHRAN 1,497,489

ROCKER DUMP TRUCK

Filed Nov. 15, 1920

Inventor
Clyde E. Cochran,
By Baker Macklin,
Attorneys.

Patented June 10, 1924.

1,497,489

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

ROCKER DUMP TRUCK.

Application filed November 15, 1920. Serial No. 424,276.

*To all whom it may concern:*

Be it known that I, CLYDE E. COCHRAN, a citizen of the United States, residing at Cleveland, in the county of Cuyahoga and State of Ohio, have invented a certain new and useful Improvement in Rocker Dump Trucks, of which the following is a full, clear, and exact description, reference being had to the accompanying drawings.

This invention relates to vehicles, and the general object of the invention is to provide a vehicle body which may be operated to dump the contents. The general object of the invention is to provide a novel means for operating a dumping body.

A specific object is to provide in a dumping body a novel means to tilt the body and to open the endgate. A further object of the invention is to provide a novel form of link and chain construction adapted to turn the body and at the same time raise the endgate.

Figure 1:
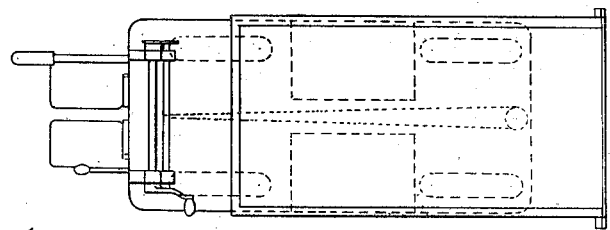
Figure 2:
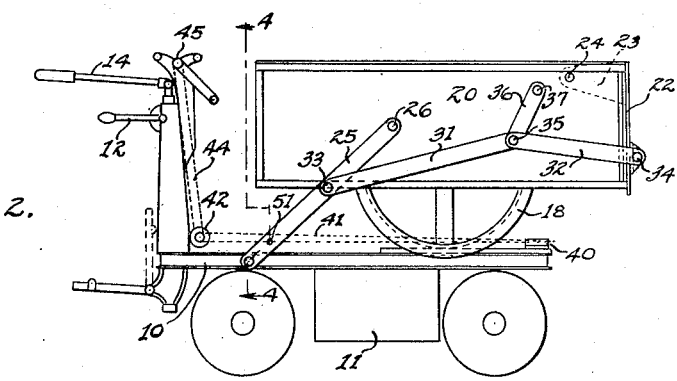
Figure 3:
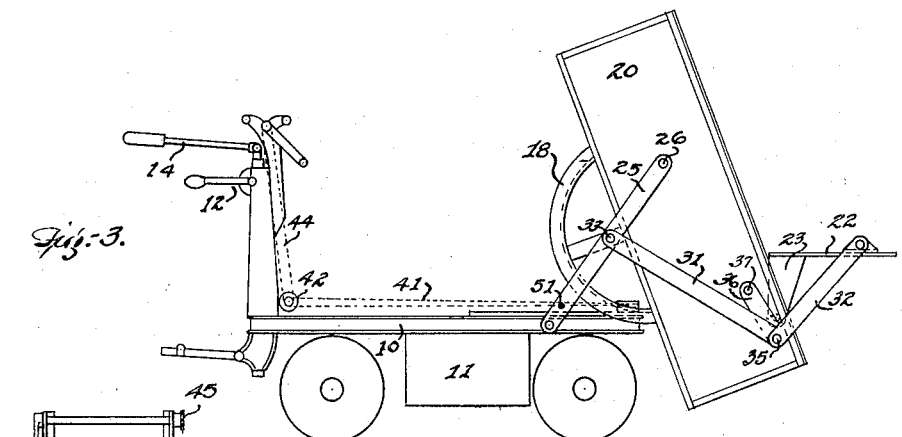
Figure 4:
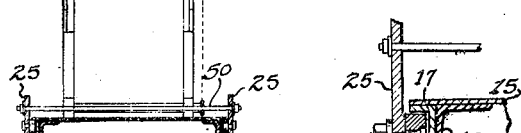
Figure 5:
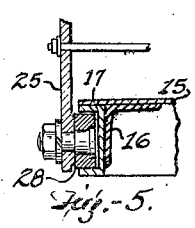

Further objects of the invention will be apparent from the following description taken in connection with the accompanying drawings, wherein Fig. 1 is a top plan view of a truck provided with my novel dumping body; Fig. 2 is a side elevation thereof, the body being shown in normal position; Fig. 3 is a view similar to that shown in Fig. 2 with the dump body in dumping position; Fig. 4 is a section on the line 4—4 of Fig. 2, and Fig. 5 is a fragmentary section detail.

Referring to the drawings, I have shown at 10 a suitable truck, which may be of the motor operated industrial type. Current for the motor is supplied by a battery 11 and the speed is governed by a controller 12, while a suitable steering handle 14 serves to direct the truck. The frame 10 of the truck may include a top plate 15 which may have angle irons 16 secured upon the underside thereof. Suitable channel irons 17 are shown as secured to the angle members 16.

Secured beneath the dumping body 20 and overhanging the channels 17 and in close proximity thereto I have shown a pair of rockers 18. These rockers are formed from angle iron, the side flanges of which serve to retain the body on the truck frame when the same is being dumped. As will be noted, the rockers are disposed approximately midway of the length of the dumping body so that the weight of a load in the body will not cause an undue tilting tendency. I have shown the dumping body as provided with an endgate 22, pivotally mounted by means of projections 23 upon the body at 24.

To provide means for tilting the body I have shown a pair of levers 25 each pivoted at one end to the body at 26 and provided at the other end with a roller 28, which is adapted to be received between the flanges of the channel 17.

Mounted upon the rear of the dump body is a sheave 40 about which an endless chain 41 extends, the chain passes over a sprocket 42 mounted adjacent the front of the body 10. The sprocket 42 is driven by means of a chain 44, the latter being operated by suitable means 45 which may comprise a sprocket and crank. A suitable brake or stop means is provided so that movement of the dump body may be arrested when desired.

In order to tilt the body 20 I may provide a rod 50 which is shown as secured to the levers 25 and is also secured to the chain 41 at 51. It will thus be apparent that as the chain moves rearwardly in Fig. 2 the lower end of the lever 25 will move with it since the lower end of this lever is constrained to move between the flanges on the channel, the result will be that the forward end of the dump body 20 is raised.

As the body tilts it is desirable that the endgate be raised and in order to bring this about I provide a pair of links 31, 32, the former being secured to the lever 25 at 33 while the link 32 is secured to the endgate at 34. The links are joined so that they may have a pivot movement at 35 and are suppoted on the pivot 35 by a link 36, which is in turn pivoted to the truck body at 37.

As the lever 25 moves to the rear (see Fig. 2) it pushes the link 31 which operates the links 32 and 36. This movement causes the link 32 to move the endgate and as the movement of the chain 41 continues the dumping body is moved to an approximate vertical position while the endgate is moved to rest upon the top of the body.

From the foregoing description it will be apparent that I have invented a dumping truck which can be readily made, and in which but few special parts are required.

Having thus described my invention, I claim:—

1. The combination of a truck body and a dumping body movably mounted thereon, a flexible member and a winding mechanism for moving the dumping body, an endgate for the dumping body, a link mounted to move at one end along the truck body and having the other end pivoted to tilt said dumping body, a connecting means between the flexible member and said link, and a second link having one end pivotally mounted on said link and having the other end supported by a third link, said second link being adapted to operate the endgate when the flexible member moves the dumping body to a dumping position.

2. The combination of a truck body and a dumping body mounted thereon and having an endgate, a rocker on which said dumping body is supported, a channel on said truck body, a link having a roller mounted to move in said channel and having one end pivoted to tilt said dumping body, a flexible member, a winding mechanism therefor, a connecting means between the roller link and the flexible member, and a second link having one end pivotally mounted on said link and having the other end supported by a third link, said second link being adapted to operate the endgate when the flexible member moves the dumping body to a dumping position.

3. The combination of a truck body having a dumping body movably supported thereon, a member movable at one end along said truck body and having the other end pivoted to said dumping body, a flexible member extending from the forward end of the truck body rearwardly beneath the dumping body, means connecting the flexible member with said movable member, a link secured to said dumping body, an endgate on said dumping body, a pair of links each having one end secured to said first mentioned link and having the other end secured respectively to said member and to the endgate and a winding mechanism for the flexible member, whereby movement of said member when actuated by said flexible member along said truck body causes the dumping body to be tilted and the endgate to be lifted.

4. The combination of a truck body having a dumping body supported on rockers thereon, a channel adjacent the sides of said truck body, a member guide along said channel and pivoted to said dumping body, a link secured to said dumping body for imparting a tilting movement thereto, an endgate on said dumping body and a pair of links each having one end secured to said first mentioned link and having the other end secured respectively to said member and to the endgate, whereby movement of said member along said channel causes said truck body to be tilted and the endgate to be lifted, an operator's support on the forward end of the truck body, a flexible member extending downwardly and then rearwardly from the operator's position and a connecting means between the flexible member and the tilting link, whereby the body may rocked by the operator when on the support.

5. The combination of a truck frame having a dumping body movably supported thereon, a member engaging the truck frame longitudinally thereof and pivotally engaging the dumping body, an operator's support at the forward end of the truck frame, a flexible member extending from the front to the rear of the truck frame, a connecting means between said longitudinally movable member and the flexible member and winding means mounted on the truck frame and operable from the operator's platform for effecting the dumping and repositioning of the body by operation of said winding mechanism.

In testimony whereof, I hereunto affix my signature.

CLYDE E. COCHRAN.

Witnesses:
F. G. HEISS,
L. I. HOLT.